United States Patent Office.

NORMAN J. WELLS, OF HUNTINGTON, MASSACHUSETTS.

Letters Patent No. 61,371, dated January 22, 1867.

---

IMPROVED PROCESS FOR PURIFYING AND CLEANSING SIZING FOR PAPER, &c.

---

The Schedule referred to in these Letters Patent and making part of the same.

---

TO ALL WHOM IT MAY CONCERN:

Be it known that I, NORMAN J. WELLS, of Huntington, in the county of Hampshire, and State of Massachusetts, have invented a new and useful Process for Purifying and Cleansing Sizing; and I do hereby declare that the following is a full, clear, and exact description thereof, reference being had to the accompanying model or sample, making a part of this specification.

The nature of my invention consists in so treating sizing, used in the manufacture of paper, as to remove from it the gelatine, all impurities, and all coloring matter, so that it shall be nearly white or transparent, and still shall retain the necessary hardness, toughness, and consistency necessary in the manufacture and treatment of paper.

To enable others skilled in the art to make and use my invention, I will proceed to describe its operation and application to use.

In the first place, I put the animal scraps, or substance from which the sizing is made, into a large tub of water and soak it for several hours, and I also put into the water either nitric, sulphuric, or muriatic acid and chloride of lime for the purpose of bleaching. After the scraps are well soaked, they are then taken out and put into fresh water, which is then boiled. I then take alum in the proportion of about twenty-four pounds of alum to about twelve hundred pounds of scraps, taking about six pounds of alum at a time in any convenient vessel and sprinkle it all over the surface of the water while boiling, or throw it into the boiling water, thoroughly stirring it while boiling. I then let it rest a few minutes, so that the impurities may rise to the surface, and I then skim off such of the impurities as may have risen; and I then repeat the process, sprinkling or throwing in about six pounds more, stirring it, letting it rest a few minutes, and skimming it as before; in all, going through this operation about four times. I may, however, if not sufficiently pure, use a little more alum, and go through the operation again, although the sizing will generally be sufficiently pure in going through the operation four times. Instead of using alum, I can use the article known in commerce as sal soda, in the proportion of about twelve pounds sal soda to about twelve hundred pounds of scraps. After it is thus thoroughly cleansed, I shut the steam or heat nearly off, so that it may boil slowly, and in from one-half hour to four hours the gelatinous matter begins to curdle and gather and separates from the glutinous matter, and finally settles to the bottom. After slowly boiling thus for ten or twelve hours, as may be necessary, I shut the steam or heat entirely off and let it stand for about one hour, and then draw it off, letting it pass through alum to sweeten it and finish the cleansing process. By my invention I am enabled to so purify sizing that I can manufacture it from much cheaper and poorer scraps, some of the accompanying samples having been manufactured from stock costing only two cents per pound, whereas the sizing generally used is manufactured from much more expensive stock, costing as high as twelve to fifteen cents per pound; my process thus saving great expense in the treatment and manufacture of sizing.

I am aware that alum has been long used in the manufacture and treatment of sizing, but it has been used only to strain the sizing through, or has been put into the sizing when cold to sweeten it or prevent it from becoming sour and to remove the disagreeable odor; but it has never been used in the manner in which I use, to my knowledge. I do not intend to confine myself to the process of soaking with acid and chloride of lime, as sizing of an inferior quality may be prepared without their use.

Having thus described my invention, what I claim as new, and desire to secure by Letters Patent, is—

The use of alum, or the equivalent mentioned, in the process of preparing sizing, when used and applied in the manner substantially as herein described and for the purpose set forth.

NORMAN J. WELLS.

Witnesses:
J. P. BUCKLAND,
T. A. CURTIS.